(12) United States Patent
Makino et al.

(10) Patent No.: US 11,035,442 B2
(45) Date of Patent: Jun. 15, 2021

(54) DOOR MOVEMENT DEVICE

(71) Applicant: AISIN SEIKI KABUSHIKI KAISHA, Kariya (JP)

(72) Inventors: Sadayuki Makino, Nagoya (JP); Kenta Mori, Kariya (JP); Eisuke Umemura, Kasugai (JP); Kiyohiro Fukaya, Takahama (JP); Takemitsu Sumiya, Kariya (JP); Nobuyasu Miwa, Ichinomiya (JP); Akihiro Yasui, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 501 days.

(21) Appl. No.: 15/529,548

(22) PCT Filed: Nov. 30, 2015

(86) PCT No.: PCT/JP2015/083625
§ 371 (c)(1),
(2) Date: May 25, 2017

(87) PCT Pub. No.: WO2016/088720
PCT Pub. Date: Jun. 9, 2016

(65) Prior Publication Data
US 2017/0335929 A1    Nov. 23, 2017

(30) Foreign Application Priority Data

Dec. 4, 2014    (JP) .............................. JP2014-246014

(51) Int. Cl.
*F16H 7/18* (2006.01)
*B60J 5/04* (2006.01)
(Continued)

(52) U.S. Cl.
CPC ................ *F16H 7/18* (2013.01); *B60J 5/047* (2013.01); *E05F 15/643* (2015.01);
(Continued)

(58) Field of Classification Search
CPC ....... F16H 7/18; B60J 5/04; B60J 5/06; E05F 15/662
(Continued)

(56) References Cited

U.S. PATENT DOCUMENTS 4,564,098 A * 1/1986 Hormann ............... E05F 15/668
192/150
5,221,236 A * 6/1993 Raymer ................... B62M 9/16
474/109
(Continued)

FOREIGN PATENT DOCUMENTS

JP         9-32897 A      2/1997
JP         9-328963 A    12/1997
(Continued)

OTHER PUBLICATIONS

International Search Report dated Feb. 23, 2016, in PCT/JP2015/083625, filed Nov. 30, 2015.
(Continued)

*Primary Examiner* — Michael R Mansen
*Assistant Examiner* — Mark K Buse
(74) *Attorney, Agent, or Firm* — Oblon, McClelland, Maier & Neustadt, L.L.P.

(57) ABSTRACT

A door moving apparatus includes a motor unit, a first gear, a second gear, an endless belt, a drum, and a rotator. The first gear is mounted on a rotary shaft of the motor unit. The second gear includes a diameter larger than a diameter of the first gear and teeth more than the first gear. The endless belt passes over the first gear and the second gear. A rotary power of the second gear is transmitted to the drum via a rotary (Continued)

power transmission mechanism. The rotator is configured to reduce a separation of the endless belt from a preset running path.

7 Claims, 7 Drawing Sheets

(51) Int. Cl.
    *E05F 15/662*    (2015.01)
    *E05F 15/643*    (2015.01)
    *F16H 1/08*      (2006.01)
    *F16H 37/02*     (2006.01)
(52) U.S. Cl.
    CPC ............. *E05F 15/662* (2015.01); *F16H 1/08* (2013.01); *F16H 37/02* (2013.01); *E05Y 2201/434* (2013.01); *E05Y 2201/72* (2013.01); *E05Y 2900/531* (2013.01)
(58) Field of Classification Search
    USPC .......................................... 474/135, 134, 144
    See application file for complete search history.

(56) References Cited

U.S. PATENT DOCUMENTS

| | | | | |
|---|---|---|---|---|
| 7,328,934 | B2* | 2/2008 | Sato | ...................... E05F 15/646 296/155 |
| 7,896,765 | B2* | 3/2011 | Kuo | ...................... F16H 7/1281 474/134 |
| 2004/0043854 | A1* | 3/2004 | Fraley, Jr. | ............ B62D 5/0424 474/134 |
| 2004/0127318 | A1* | 7/2004 | Yu | .......................... F16H 7/1281 474/134 |
| 2006/0137136 | A1* | 6/2006 | Imai | ...................... E05F 15/632 16/52 |
| 2006/0284447 | A1* | 12/2006 | Sato | ...................... E05F 15/646 296/155 |
| 2010/0107502 | A1* | 5/2010 | Okada | .................... F16D 37/008 49/349 |

FOREIGN PATENT DOCUMENTS

| | | |
|---|---|---|
| JP | 2006-348668 A | 12/2006 |
| JP | 2012-7319 A | 1/2012 |

OTHER PUBLICATIONS

International Preliminary Report on Patentability and Written Opinion dated Jun. 6, 2017 in PCT/JP20151083625 (submitting English translation only).

* cited by examiner

DOOR MOVEMENT DEVICE

TECHNICAL FIELD

The present invention relates to a door moving apparatus moving a sliding door.

BACKGROUND ART

As a door moving apparatus moving a sliding door, for example, a technology disclosed in Patent document 1 is known. The door moving apparatus includes a motor unit, a worm gear which is mounted on a rotary shaft of the motor unit, a differential reduction gear which reduces a rotary speed of the worm gear, a drum which is mounted on a rotary shaft of the differential reduction gear, and two cables which are wound on the drum.

DOCUMENT OF PRIOR ART

Patent Document

Patent document 1: JP 2012-7319A

OVERVIEW OF INVENTION

Problem to be Solved by Invention

Meanwhile, the quietness is required for the door moving apparatus. For example, in a case where the door moving apparatus generates a large noise when operating, the noise may leak inside a vehicle. An object of the present invention is to provide a door moving apparatus which generates a small noise when operating.

Means for Solving Problem (1) A door moving apparatus which solves the aforementioned problem includes a motor unit, a first gear being mounted on a rotary shaft of the motor unit, a second gear including a diameter larger than a diameter of the first gear and teeth more than the first gear, an endless belt passing over the first gear and the second gear, a drum being mounted on a rotary shaft of the second gear, or being mounted on the rotary shaft of the second gear via a rotary power transmission mechanism; and a rotator being configured to reduce a separation of the endless belt from a preset running path.

A differential reduction gear is used in the conventional door moving apparatus as a reduction gear. The differential reduction gear generates large noise when operating since plural gears are engaged with one another. On the other hand, according to the aforementioned configuration, the rotary power of the first gear is transmitted to the second gear via the endless belt. Accordingly, since the first gear and the second gear are not directly in contact with each other, the noise may be reduced. Meanwhile, the tooth jump may occur by the use of the endless belt, however, since the rotator which reduces the separation of the endless belt from the preset running path is provided, the endless belt is inhibited from causing the tooth jump.

(2) The aforementioned door moving apparatus includes two rotators. Each of the two rotators is disposed at a portion which is in a vicinity of the preset running path of the endless belt, the portion in which at least a portion of the first gear and at least a portion of the rotator are overlapped with each other when seen from a direction orthogonal to a common tangential line between the first gear and the second gear.

Since the first gear includes the diameter smaller than that of the second gear, and by an elasticity of the endless belt, a portion of the endless belt starting to separate from the first gear and a portion ahead of the portion, or a portion of the endless belt starting to pass over the first gear and a portion behind of the portion more easily separates to the outer side from the preset running path than the other portions. According to the configuration, with this taken into consideration, each of the two rotators is disposed at a portion which is in a vicinity of the preset running path of the endless belt, the portion in which at least a portion of the first gear and at least a portion of the rotator are overlapped with each other when seen from a direction orthogonal to a common tangential line between the first gear and the second gear. Accordingly, the separation of the endless belt from the preset running path is reduced. Thus, the endless belt is further inhibited from causing the tooth jump.

(3) In the aforementioned door moving apparatus, the rotator which is disposed at an upstream in a running direction does not come in contact with an outer surface of the endless belt and the rotator which is disposed at a downstream in the running direction comes in contact with the outer surface of the endless belt when the endless belt runs.

According to this configuration, the endless belt comes in contact with one of the rotators when running and separating from the preset running path. Accordingly, comparing to a configuration in which the endless belt and the rotator are continuously in contact with each other by the rotator which is in contact with the endless belt before the endless belt starts running, the friction applied to the endless belt decreases.

(4) In the aforementioned door moving apparatus, the rotator is configured so as to be approachable and separable relative to the first gear, and is biased toward the first gear. Since components of the door moving apparatus have dimension error or assembling error when manufacturing, a spacing distance between a rotary shaft of the first gear and the support shaft of the rotator varies per product of the door moving apparatus. Accordingly, there is a case in which the spacing distance between the rotary shaft of the first gear and the support shaft of the rotator comes to be smaller than a minimum limit of size when the door moving apparatus is produced. In this case, since the rotator is pressed toward the endless belt, an excessive power is applied to the endless belt. Such products are removed by, for example, an examination, and the yield rate decreases.

On the other hand, according to the aforementioned configuration, the rotator is disposed in the vicinity of the first gear so as to be approachable and separable relative to the first gear, and is biased toward the first gear. Accordingly, even though the endless belt comes in contact with the rotator since the spacing distance between the rotary shaft of the first gear and the support shaft of the rotator decreases due to the dimension error or the assembling error when manufacturing, the endless belt is inhibited from being applied with the excessive power since, in this case, the rotator moves so as to be away from the first gear. That is, according to the configuration, comparing to the door moving apparatus which does not include this configuration, the minimum limit of size of the spacing distance between the rotary shaft of the first gear and the support shaft of the rotator may increase, thereby the production yield may be enhanced.

(5) In the aforementioned door moving apparatus, the rotary power transmission mechanism includes a third gear which is provided at a rotary shaft of the second gear, the third gear including a diameter which is smaller than the diameter of the second gear and teeth less than the second gear, and a fourth gear to which the drum is mounted, the fourth gear including a diameter which is larger than the diameter of the third gear and teeth more than the third gear, the fourth gear meshing with the third gear. According to the configuration, since the rotary speed decreases in two stages, the reduction gear ratio increases. Meanwhile, in the configuration, because the endless belt is used in a first stage in which the rotary speed is high, the noise is reduced comparing to a configuration in which the endless belt is used in a second stage in which a rotary speed is low.

(6) According to the aforementioned door moving apparatus, the rotator is disposed on an extension line of a line connecting a rotary center of the first gear and a rotary center of the second gear. In this configuration, a portion where the endless belt most securely engages with the first gear at a range where the endless belt engages with the first gear is inhibited from moving to the outer side (a radial direction of the first gear). Accordingly, the endless belt is inhibited from causing the tooth jump.

(7) According to the aforementioned door moving apparatus, the rotator corresponds to one of two rotators, and the two rotators are supported by a support portion and biased toward the first gear by a biasing member. In this configuration, because the rotators are biased, the product yield is enhanced. In addition, because the endless belt comes in contact with the rotators when separating from the preset running path, the separation of the endless belt from the preset running path is reduced.

MODE FOR CARRYING OUT THE INVENTION

A door moving apparatus will be explained with reference to FIGS. 1 to 7. In the following explanation, a door moving apparatus 50 mounted on a sliding door module 30 is described as an example.

Figure 1:
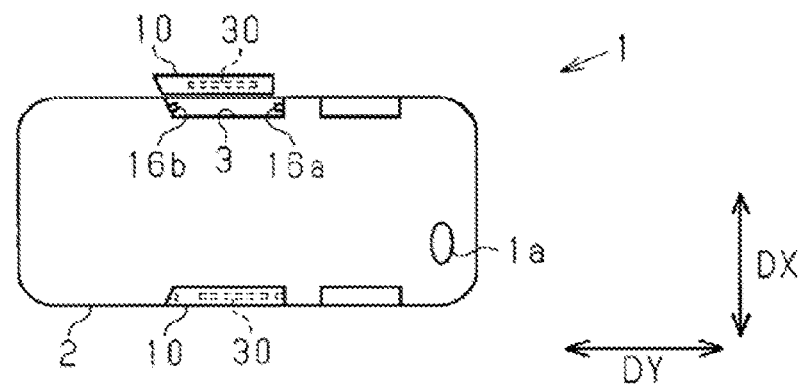
FIG. 1 is a schematic view of a vehicle to which a door moving apparatus according to an embodiment of the present invention is applied.

FIG. 1 is a plan view of a vehicle 1 when seen from a bird's-eye-view. In FIG. 1, a side where a steering wheel is disposed corresponds to a front side of a vehicle 1. In addition, in a state where a sliding door 10 is mounted on a vehicle main body 2, a direction corresponding to an upper-lower direction of the vehicle 1 is defined as an upper-lower direction DZ of the sliding door module 30. A direction corresponding to a front-rear direction of the vehicle 1 is defined as a front-rear direction DY of the sliding door module 30. A direction corresponding to a width direction of the vehicle 1 is defined as a vehicle width direction DX of the sliding door module 30.

The sliding door 10 is slidably mounted on an entrance 3 of the vehicle main body 2 via an upper guide rail 5a, a lower guide rail 5b, and a center guide rail 5c. The upper guide rail 5a supports an upper portion of the sliding door 10 via a guide roller. The lower guide rail 5b supports a lower portion of the sliding door 10 via the guide roller. The center guide rail 5c supports a center portion of the sliding door 10 via a roller unit 6 which is equipped on third and fourth cables 51, 52 which will be described later.

The sliding door 10 moves along a door rail which is laid on the vehicle main body 2 at a range from a fully-closed position where the entrance 3 closes, to a fully-open position where the entrance 3 fully opens. The sliding door 10 is mounted on the vehicle main body 2 so as to be movable in the vehicle width direction DX from the fully-closed position and in the front-rear direction DY in a state of moving from the fully-closed position to an outer side.

Figure 2:
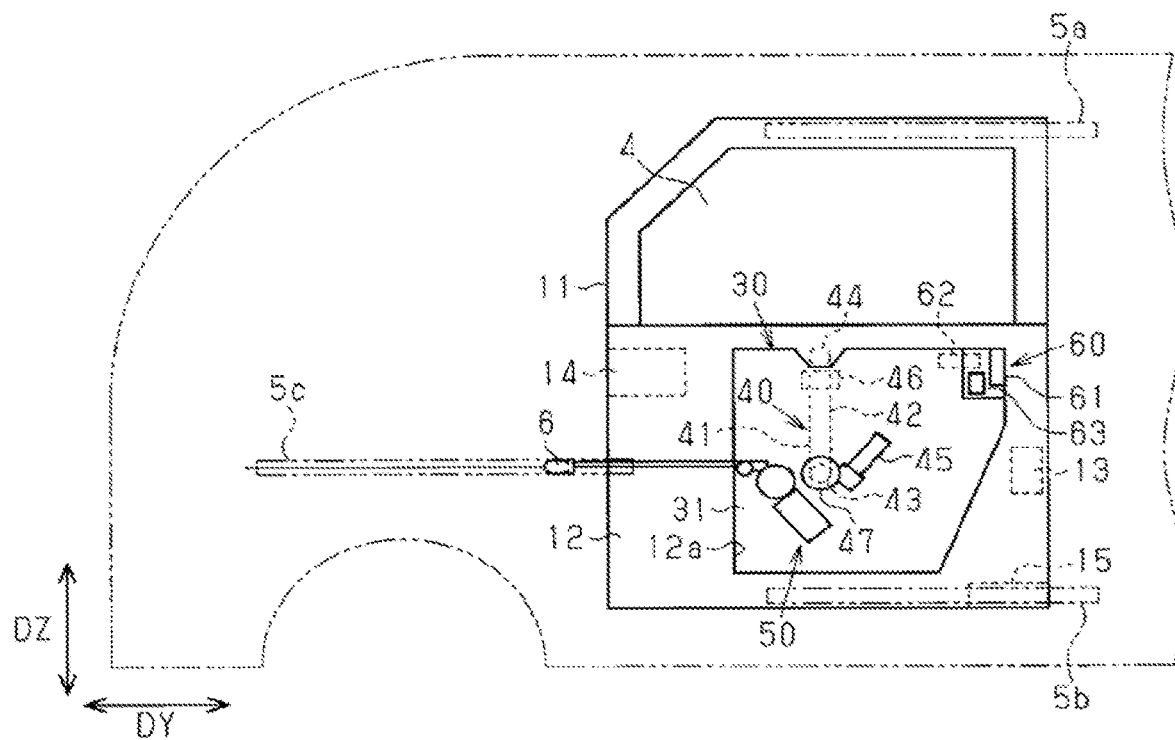
FIG. 2 is a schematic view of a sliding door in FIG. 1.

FIG. 2 is a schematic view illustrating an inner structure of the sliding door 10. The sliding door 10 includes an outer panel 11, an inner panel 12, the sliding door module 30 mounted on the inner panel 12, and a window glass 4. An interior panel is mounted on an inner side (a vehicle inner side) of the inner panel 12.

The inner panel 12 is mounted on an inner side of the outer panel 11. The inner panel 12 is provided with an opening portion 12a in which the sliding door module 30 is disposed. The window glass 4 may be contained in a space between an inner member comprised of the inner panel 12 and the sliding door module 30, and the outer panel 11.

The sliding door 10 includes a first lock device 13 disposed at a front side of the sliding door 10, a second lock device 14 disposed at a rear side of the sliding door 10, and a third lock device 15 disposed at a lower portion of the sliding door 10. The first to third lock devices 13 to 15 are disposed between the outer panel 11 and the inner panel 12.

The first lock device 13 engages with a striker 16a (see FIG. 1) provided at a front rim portion of the entrance 3 of the vehicle main body 2. The second lock device 14 engages with a striker 16b (see FIG. 1) provided at a rear rim portion of the entrance 3 of the vehicle main body 2.

The third lock device 15 engages with a striker (not illustrated) provided at a lower rim portion of the entrance 3 of the vehicle main body 2. The sliding door 10 is locked by the first and second lock devices 13, 14 when being disposed at the fully-closed position. The sliding door 10 is locked by the third lock device 15 when being disposed at the fully-open position. The sliding door 10 is restricted from moving by being locked by the first and second lock devices 13, 14 or by the third lock device 15.

The sliding door module 30 will be explained hereunder. The sliding door module 30 includes a resin-made base 31, a window glass lifting device 40 moving up and down the window glass 4, the door moving apparatus 50 moving the sliding door 10, and a door opening and closing apparatus 60 operating the first to third lock devices 13 to 15. The window glass lifting device 40, the door moving apparatus 50 and the door opening and closing apparatus 60 are mounted on the base 31.

The window lifting device 40 includes first and second cables 41, 42 pulling the window glass 4, a drum 43 winding the first and second cables 41, 42, a pulley 44 stretching the first and second cables 41, 42 by cooperating with the drum 43, a motor 45 for window glass lifting operation which rotates the drum 43, and a carrier 46 being mounted on a lower end of the window glass 4.

The drum 43 and the pulley 44 are disposed on an outer surface of the base 31. The motor 45 for window glass lifting operation is disposed at an inner surface (a surface of a vehicle inner side in the vehicle width direction DX. This definition will be the same hereunder) of the base 31. The motor 45 for window glass lifting operation and the drum 43 are connected with each other via a decelerator 47. An output shaft of the decelerator 47 is connected to the drum 43 by inserting into a through hole provided at the base 31.

The first cable 41 is stretched so as to be folded back at the pulley 44. One end of the first cable 41 is connected to the drum 43, and the other end of the first cable 41 is connected to the carrier 46. The second cable 42 is stretched so as to extend in a direction opposite to the first cable 41 relative to the carrier 46. One end of the second cable 42 is connected to the carrier 46, and the other end of the second cable 42 is connected to the drum 43.

When the first cable 41 or the second cable 42 is wound by the drum 43 by the rotation thereof, the carrier 46 moves in response to the movement of the first cable 41 and the second cable 42. Accordingly, the window glass 4 goes up and down within a predetermined movement range.

The door opening and closing device 60 includes an inner handle 61 and a transmission mechanism 63 moving the first to third lock devices 13 to 15 on a basis of the movement thereof. An outer handle 62 being mounted on the outer side of the sliding door 10 is connected to the door opening and closing apparatus 60.

The inner handle 61 is rotatably mounted on the base 31 of the sliding door module 30. The inner handle 61 is provided so as to protrude to the inner side (a seat side) in the vehicle width direction DX from the interior panel.

When the inner handle 61 rotates in a first predetermined direction by a first predetermined operation (hereinafter referred to as a closing operation), the rotary movement is transmitted to the third lock device 15 via the transmission mechanism 63 to operate the third lock device 15.

In addition, when the inner handle 61 rotates in a second predetermined direction by a second predetermined operation (hereinafter referred to as an opening operation), the rotary movement is transmitted to the first and second lock devices 13, 14 via the transmission mechanism 63 to operate the first and second lock devices 13, 14.

When the outer handle 62 rotates in a predetermined direction by a predetermined operation (for example, a pulling operation), the rotary movement is transmitted to the first to third lock devices 13 to 15 via the transmission mechanism 63 to operate the first to third lock devices 13 to 15 by the transmitted power.

Figure 3:
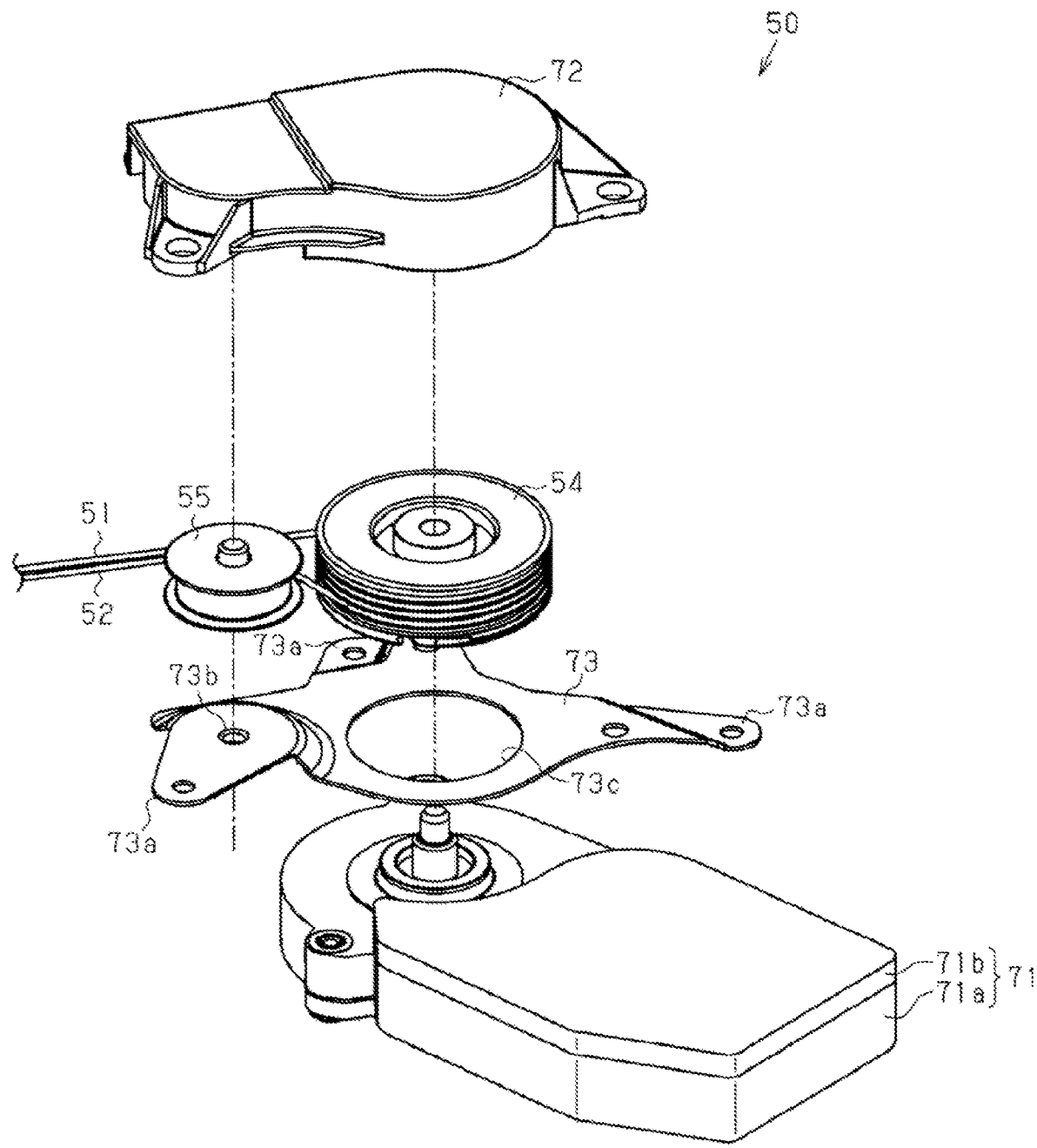
FIG. 3 is an exploded perspective view of the door moving apparatus in FIG. 2.

The door moving apparatus 50 will be explained with reference to FIG. 3. The door moving apparatus 50 winds and releases the third and fourth cables 51, 52 which pull the sliding door 10.

The door moving apparatus 50 includes a drum 54 winding the third and fourth cables 51, 52, a guide pulley 55 guiding one of the third and fourth cables 51, 52 to the drum 54, a motor unit 56 (see FIG. 4) rotating the drum 54, and a decelerator 57 reducing the rotary speed of the motor unit 56.

The motor unit 56 and the decelerator 57 are contained in a first case 71. The drum 54 and the guide pulley 55 are covered with the second case 72. The first case 71 includes a bottom case 71a, and a lid case 71b covering an opening portion of the bottom case 71a. The bottom case 71a of the first case 71 is joined to the base 31 by a joint member. A portion of the lid case 71b where a fourth gear 57d (see FIG. 4) is disposed is pressed toward the base 31 by a bracket 73.

The bracket 73 includes joint portions 73a for joining the bracket 73 to the base 31, a fix portion 73b to which a support shaft supporting the guide pulley 55 is fixed, and a hole 73c into which a rotary shaft 57t of the fourth gear 57d is inserted.

The drum 54 and the guide pulley 55 are disposed at an outer surface side (an opposite surface of a surface being in contact with the first case 71) of the bracket 73. The drum 54 and the guide pulley 55 are covered with the second case 72.

An end of the third cable 51 is connected to a front end side of the center guide rail 5c being fixed at the vehicle main body 2. An end of the fourth cable 52 is connected to a rear end side of the center guide rail 5c being fixed at the vehicle main body 2. The respective other ends of the third cable 51 and the fourth cable 52 are connected to the drum 54.

One of the third and fourth cables 51, 52 is guided by the guide pulley 53 and is wound by the drum 54. The other of the third and fourth cables 51, 52 is wound by the drum 54 without being guided by the guide pulley 55. That is, a winding direction of the third cable 51 relative to the drum 54 is opposite to a winding direction of the fourth cable 52 relative to the drum 54. By this configuration, the third cable 51 and the fourth cable 52 are wound in a manner described as follows by the drum 54 on a basis of the rotation of the drum 54. That is, when the drum 54 rotates in a predetermined direction, one of the third cable 51 and the fourth cable 52 is wound, and the other of the third cable 51 and the fourth cable 52 is released. When the drum 54 rotates in an opposite direction of the predetermined direction, a cable being wound and a cable being released are opposite to a case where the drum 53 rotates in the predetermined direction. As such, the sliding door 10 moves forward and backward of the vehicle 1.

The configurations of the motor unit 56 and the decelerator 57 will be explained with reference to FIG. 4. The motor unit 56 corresponds to a brushless motor and is comprised of a circular ring-shaped rotor 56a and a stator 56b which is disposed at an outer side of the rotor 56a. The rotor 56a is made of a magnet. The stator 56b is comprised of a yoke and a coil. A sensor (not illustrated) detecting a rotary position of the rotor 56a is disposed within the motor unit 56. A drive circuit driving the motor unit 56 is disposed within the first case 71. Alternatively, the drive circuit may be disposed out of the first case 71.

The decelerator 57 includes a first gear 57a being mounted on an output shaft (a rotary shaft 57r) of the motor unit 56, a second gear 57b including a rotary shaft 57s, the endless belt 58 passing over the first gear 57a and the second gear 57b, a third gear 57c being provided at the rotary shaft 57s of the second gear 57b, and the fourth gear 57d being meshed with the third gear 57c.

The endless belt 58 is made of, for example, a fiber-containing rubber having a glass-made core wire. The drum 54 is mounted on the rotary shaft 57t (the output shaft) of the fourth gear 57d. The bottom case 71a is provided with a separation reduction mechanism reduces the separation of the endless belt 58 from a preset running path L (see FIG. 6B).

The preset running path L corresponds to a running path of the endless belt 58 when the endless belt 58 runs in a state where the endless belt 58 passes over the first gear 57a and the second gear 57b without looseness and without generating looseness.

The second gear 57b includes a diameter larger than that of the first gear 57a and teeth more than the first gear 57a. The third gear 57c includes a diameter smaller than that of the second gear 57b and teeth less than the second gear 57b. The fourth gear 57d includes a diameter larger than that of the third gear 57c and includes teeth more than the third gear 57c. In this configuration, the rotary speed of the motor unit 56 is reduced. Meanwhile, a mechanism (hereinafter referred to as a rotary power transmission mechanism 57x) transmitting a rotary power of the second gear 57b to the drum 54 is comprised of the third gear 57c and the fourth gear 57d. The rotary power transmission mechanism 57x reduces the rotary speed of the second gear 57b.

It is favorable that the third gear 57c and the fourth gear 57d are configured by a helical gear. According to this configuration, comparing to a case where the third gear 57c and the fourth gear 57d are configured by a spur gear, the operation noise may be further reduced.

Figure 4:
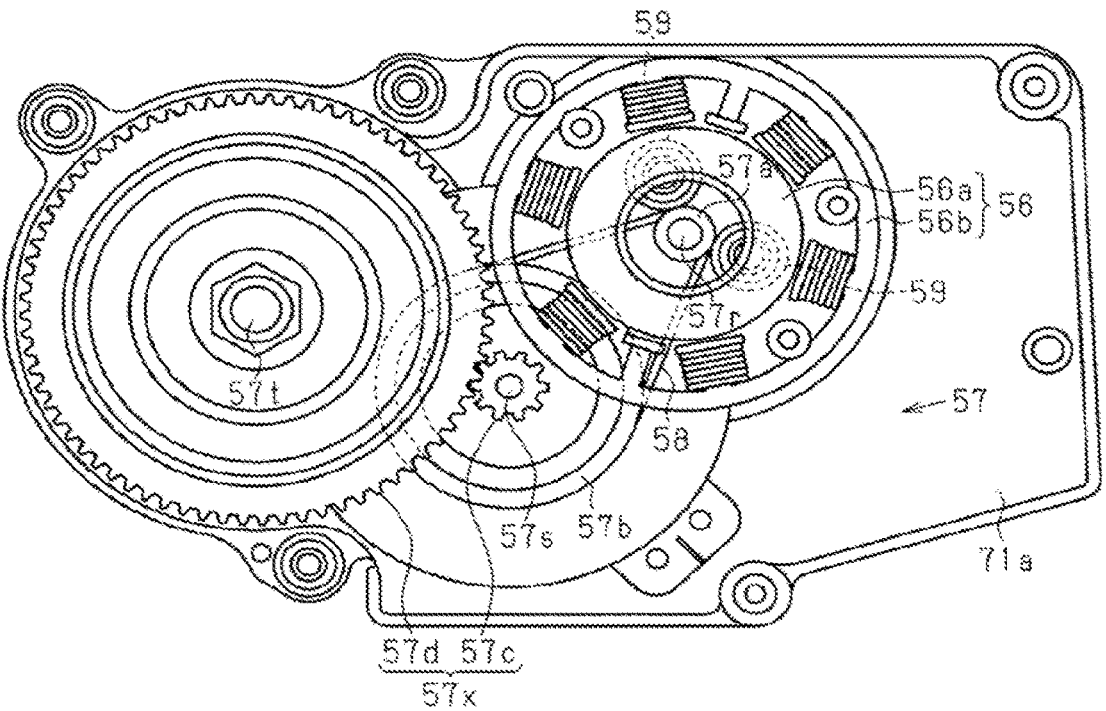
FIG. 4 is a plan view of a motor unit and a decelerator in FIG. 3.
Figure 5:
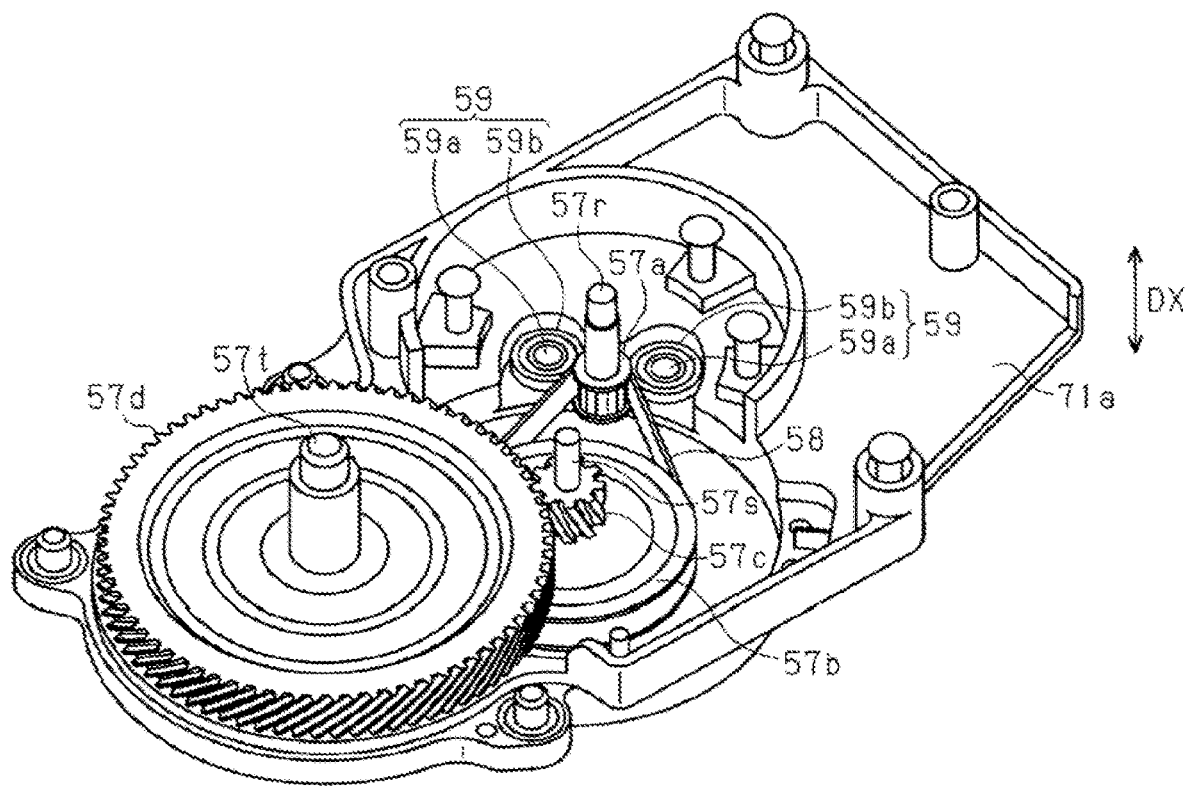
FIG. 5 is a perspective view of the decelerator in FIG. 4.

FIG. 5 is a view, seen perpendicularly, of the structural body in FIG. 4 from which the motor unit 56 is removed. As shown in FIG. 5, the first gear 57a and the second gear 57b are disposed at the same position in the vehicle width direction DX, and the third gear 57c and the fourth gear 57d are disposed at an inner position relative to the first gear 57a and the second gear 57b in the vehicle width direction DX. The motor unit 56 is disposed at an inner position relative to the first gear 57a and the second gear 57b in the vehicle width direction DX. Seen from the vehicle with direction DX, the second gear 57b and the fourth gear 57d are disposed so as to be overlapped with each other at respective parts. Seen from the vehicle with direction DX, the second gear 57b and the motor unit 56 are disposed so as to be overlapped with each other at respective parts. By this overlapping structure, the area of the door moving apparatus 50 at a vertical surface relative to the vehicle width direction DX decreases.

The separation reduction mechanism of the endless belt 58 will be explained with reference to FIGS. 5 and 6. The endless belt 58 passing over a gear having a small diameter and a gear having a large diameter may cause tooth jumps. The tooth jump corresponds to a case where the tooth of the endless belt 58 separates from a tooth (hereinafter referred to as a first tooth) which was meshed therewith in the gear and is meshed with other tooth which is different from the first tooth. Such tooth jump may deform or deteriorate the tooth of the endless belt 58 since large frictional force is applied to the endless belt 58 when the tooth of the endless belt 58 is meshed with the other tooth by jumping the first tooth.

Such tooth jump may easily occur when high load is applied to the gear. In addition, the tooth jump may easily occur in a case where the gear includes a small diameter. It is because the endless belt 58 does not easily come along with an outer periphery of the gear caused by the elasticity of the endless belt 58 in a case where the curvature of the endless belt 58 which passes over the gear increases.

In addition, the endless belt 58 passing over the large-diameter gear and the small-diameter gear may easily cause tooth jumps since a tooth of the endless belt 58 that engages with the small-diameter gear decreases as a clearance between two gears decreases and as a gear ratio (the number of teeth of the large-diameter gear divided by the number of teeth of the small-diameter gear) increases.

According to the present embodiment, the first gear 57a has the highest load among the first to fourth rotary gears. The first gear 57a has the diameter smaller than that of the second gear 57b. In addition, as described above, the second gear 57b and the motor unit 56 are disposed so as to be overlapped with each other. Thus, comparing to a case where the second gear 57b and the motor unit 56 are disposed so as not to be overlapped with each other, a clearance between the first gear 57a and the second gear 57b decreases. Accordingly, the tooth jump of the endless belt 58 easily occurs at the first gear 57a. By such a circumstance, the separation reduction mechanism for the endless belt 58 is provided to support the endless belt 58 passing over the first gear 57a.

The separation reduction mechanism is configured as a mechanism which comes in contact with at least the endless belt 58 when the endless belt 58 is away from the preset running path L. For example, the separation reduction mechanism is configured as a rotator 59. The rotator 59 includes a support shaft 59a and a rotary portion 59b rotating about the support shaft 59a as a center shaft. The rotary portion 59b includes a cylindrical structure or a circular ring structure. In particular, the rotator 59 is configured by a pulley or a bearing.

In a range of the endless belt 58 passing over the first gear 57a, a part of the endless belt 58 which starts separating (hereinafter referred to as a separation portion) from the first gear 57a more easily separates from the preset running path L (see two-dotted lines in FIG. 6B) than a part of the endless belt 58 which starts passing over the first gear 57a. It is because a downstream of the endless belt 58 (a portion at the downstream relative to the first gear 57a) is loosened by an upstream of the endless belt 58 (a portion at the upstream relative to the first gear 57a) which is pulled caused by the endless belt 58 which runs by the rotary power of the first gear 57a.

Accordingly, the rotator 59 as the separation reduction mechanism is disposed at the separation portion to reduce a loosing of the separation portion at the endless belt 58. In addition, since the first gear 57a rotates in a normal direction and a reverse direction in response to a pulling direction of the third and fourth cables 51, 52, the rotators 59 serving as the separation reduction mechanism are provided at symmetric positions relative to a line LE connecting a rotary center of the first gear 57a and a rotary center of the second gear 57b (see FIG. 6A).

Figure 6A:
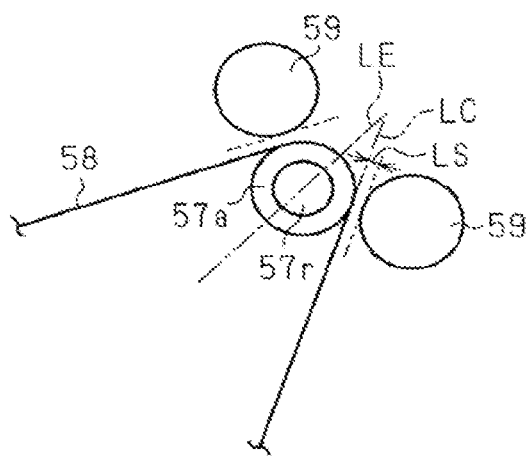
FIG. 6A is a schematic view illustrating an example of positions of rotators in FIG. 5, and a positional relationship between an endless belt and the rotators when the endless belt is in a stop state.
Figure 6B:
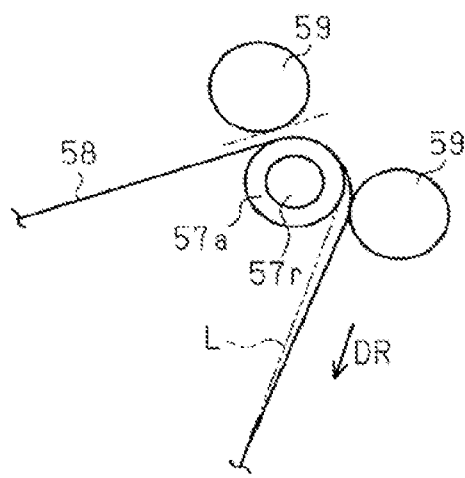
FIG. 6B is a schematic view illustrating an example of the positions of the rotators in FIG. 5 and the positional relationship between the endless belt and the rotators when the endless belt runs.

A dispositional structure of the rotators 59 as the separation reduction mechanism will be described in detail with reference to FIGS. 6 and 7. FIG. 6A illustrates a positional relationship between the endless belt 58 and the rotators 59 when the endless belt 58 is in a stop state. FIG. 6B illustrates a positional relationship between the endless belt and the rotators 59 when the endless belt 58 runs. The two-dotted lines in FIG. 6B show the preset running path L of the endless belt 58.

When the endless belt 58 runs by the rotation of the first gear 57a, as described above, the endless belt 58 at the upstream relative to the first gear 57a is pulled, and the endless belt 58 at the downstream is loosen. This phenomenon is prominent when the rotary speed of the first gear 57a increases. A portion of the endless belt 58 apart from the first gear 57a is largely loosen (see FIG. 6B). With this taken into consideration, the rotators 59 are disposed as described below.

As shown in FIG. 6B, when the endless belt 58 runs, the rotators 59 are disposed such that the rotator 59 disposed at the upstream in a running direction DR does not come in contact with an outer surface of the endless belt 58 and the rotator 59 disposed at the downstream in the running direction DR comes in contact with the outer surface of the endless belt 58.

For example, the rotator 59 is disposed at a position which separates from a common tangential line LC between the first gear 57a and the second gear 57b only by a setting distance LS. The setting distance LS is set as a distance in which the rotator 59 can reduce the separation of the endless belt 58. The setting distance LS is smaller than a tooth height (tooth depth) of the endless belt 58.

According to the disposition of the rotators 59, effects described below will be obtained. When running and separating from the preset running path L, the endless belt 58 comes in contact with the rotator 59. Accordingly, the friction applied to the endless belt 58 decreases comparing to a friction applied to a reference configuration that will be described below, that is, the reference configuration in which the endless belt 58 and the rotator 59 are continuously in contact with each other by the rotator 59 which is in contact with the endless belt 58 from when the endless belt 58 is in the stop state.

Figure 7:
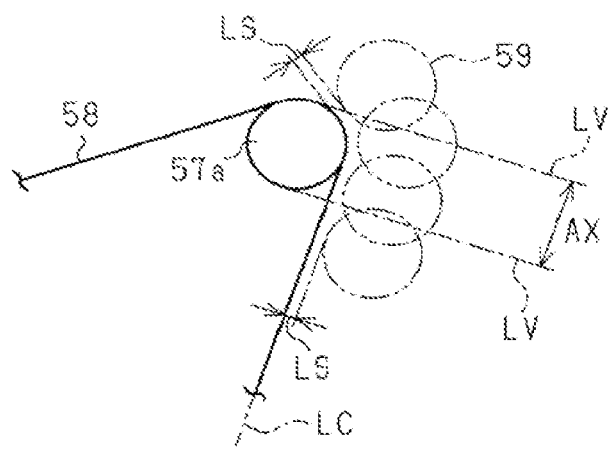
FIG. 7 is a schematic view illustrating a positional range of the rotator in FIG. 5.

Furthermore, as shown in FIG. 7, it is favorable that the rotator 59 is disposed as described below. As shown in FIG. 7, the rotator 59 is disposed in the vicinity of the preset running path L of the endless belt 58 and at a position where at least a part of the first gear 57a and at least a part of the rotator 59 are overlapped with each other when seen from a direction orthogonal to the common tangential line LC between the first gear 57a and the second gear 57b. For example, the rotator 59 is disposed such that at least a portion of the rotator 59 is entered in a range AX being in contact with an addendum circle of the first gear 57a and being between two lines LV extending orthogonally to the common tangential line LC; and is disposed at a position away from the addendum circle of the first gear 57a or from the aforementioned common tangential line LC only by the setting distance LS (see above). In FIG. 7, a positional range of one of the two rotators 59 is illustrated, however, the other of the two rotators 59 is disposed such that at least a part of the other of the two rotators 59 enters into the range AX which is preset in a similar manner.

According to the disposition, since the portion (separation portion) of the endless belt 58 which easily separates to the outer side from the preset running path L may be pressed from the outer side, the separation of the endless belt 58 from the preset running path L is efficiently reduced. Accordingly, the endless belt 58 is inhibited from causing the tooth jump.

Next, advantages of the door moving apparatus 50 according to the present embodiment will be explained.

(1) According to the present embodiment, the door moving apparatus 50 includes the first gear 57a, the second gear 57b including the diameter larger than the diameter of the first gear 57a, the endless belt 58 passing over the first gear 57a and the second gear 57b, and the rotator 59 reducing the separation of the endless belt from a preset running path.

According to the configuration, since the tooth of the first gear 57a and the tooth of the second gear 57b are not directly in contact with each other, the noise may be reduced. Meanwhile, using the endless belt 58 may cause the tooth jump, however, since the rotator 59 which reduces the separation of the endless belt 58 from the preset running path L is provided, the endless belt 58 is inhibited from causing the tooth jump.

In the present embodiment, the door moving apparatus 50 includes the two rotators 59. Each of the two rotators 59 is disposed at a portion which is in a vicinity of the preset running path L of the endless belt 58, the portion in which at least a portion of the first gear 57a and at least a portion of the rotator 59 are overlapped with each other when seen from the direction orthogonal to the common tangential line LC between the first gear 57a and the second gear 57b. According to the configuration, the separation of the endless belt 58 from the preset running path L is reduced. Accordingly, the endless belt 58 is further inhibited from causing the tooth jump.

In the present embodiment, the rotator 59 which is disposed at the upstream in the running direction does not come in contact with the outer surface of the endless belt 58 and the rotator 59 which is disposed at the downstream in the running direction comes in contact with the outer surface of the endless belt 58 when the endless belt 58 runs.

According to the configuration, the endless belt 58 comes in contact with one of the rotators 59 when running and separating from the preset running path L. Accordingly, comparing to the configuration in which the endless belt 58 and the rotator 59 are continuously in contact with each other by the rotator 59 which is in contact with the endless belt 58 before the endless belt 58 runs, the friction applied to the endless belt 58 decreases. Accordingly the endless belt 58 is inhibited from being degraded by the friction.

(4) In the present embodiment, the rotary speed of the second gear 57b is reduced by the rotary power transmission mechanism 57x. The rotary power transmission mechanism 57x includes the third gear 57c, and the fourth gear 57d to which the drum 54 is mounted. The third gear 57c is provided at the rotary shaft 57s of the second gear 57b and includes the diameter which is smaller than the diameter of the second gear 57b and teeth less than the second gear 57b. The fourth gear 57d includes the diameter which is larger than the diameter of the third gear 57c and teeth more than the third gear 57c, and meshes with the third gear 57c.

According to the configuration, since the rotary speed decreases by two stages, the reduction gear ratio increases. Meanwhile, in the configuration, because the endless belt 58 is used in a first stage where the rotary speed is high, the noise decreases comparing to a configuration in which the endless belt 58 is used in a second stage where the rotary speed is low.

Modified examples of the separation reduction mechanism will be explained with reference to FIGS. 8 to 15. The separation reduction mechanism is not limited to the aforementioned present embodiment or the modified examples described below.

A First Modified Example

Figure 8:
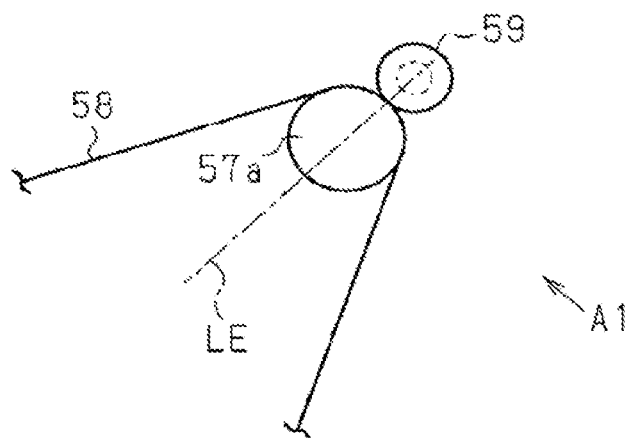
FIG. 8 is a plan view of a first modified example of a separation reduction mechanism.
Figure 9:
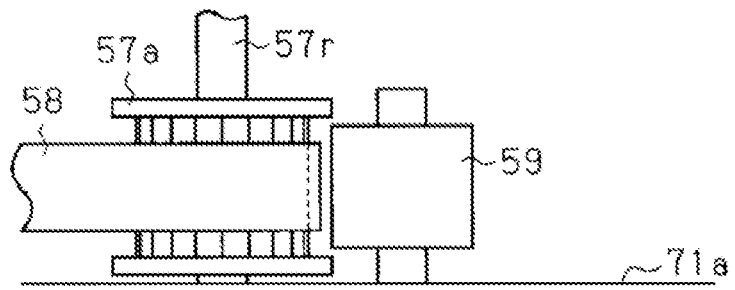
FIG. 9 is a side view of the separation reduction mechanism in FIG. 8.

The first modified example of the separation reduction mechanism will be explained with reference to FIGS. 8 and 9. FIG. 8 is a plan view of the separation reduction mechanism, and FIG. 9 is a side view of the separation reduction mechanism seen from a direction of an arrow A1.

According to the present embodiment, the two rotators 59 are disposed at a periphery of the first gear 57*a*. Meanwhile, in the first modified example, only one of the rotators 59 is disposed at the periphery of the first gear 57*a*. The rotator 59 is disposed on an extension line of the line LE connecting the rotary center of the first gear 57*a* and the rotary center of the second gear 57*b*. In this configuration, a portion of the endless belt 58 most securely engaging with the first gear 57*a* at a range where the endless belt 58 engages with the first gear 57*a* is inhibited from moving to the outer side (a radial direction of the first gear 57*a*). Accordingly, the endless belt 58 is inhibited from causing the tooth jump.

A Second Modified Example

Figure 10:
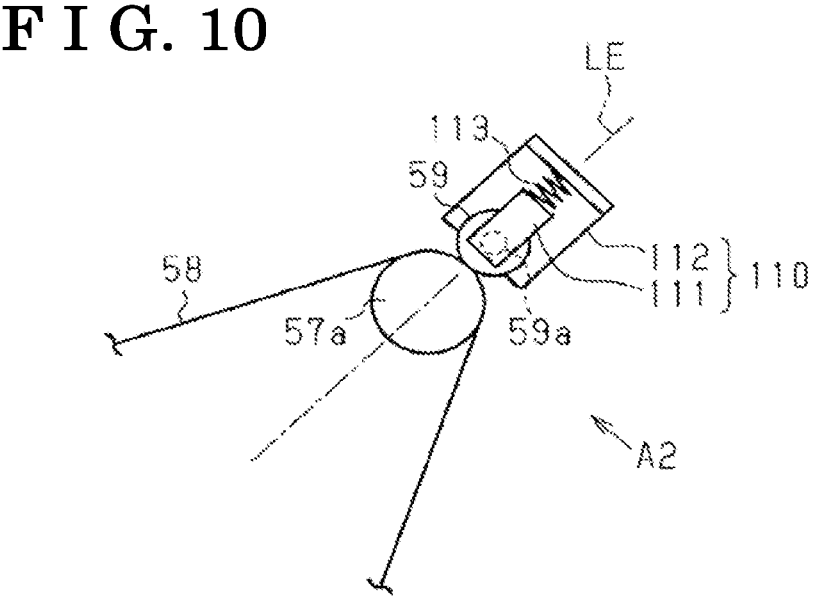
FIG. 10 is a plan view of a second modified example of the separation reduction mechanism.
Figure 11:
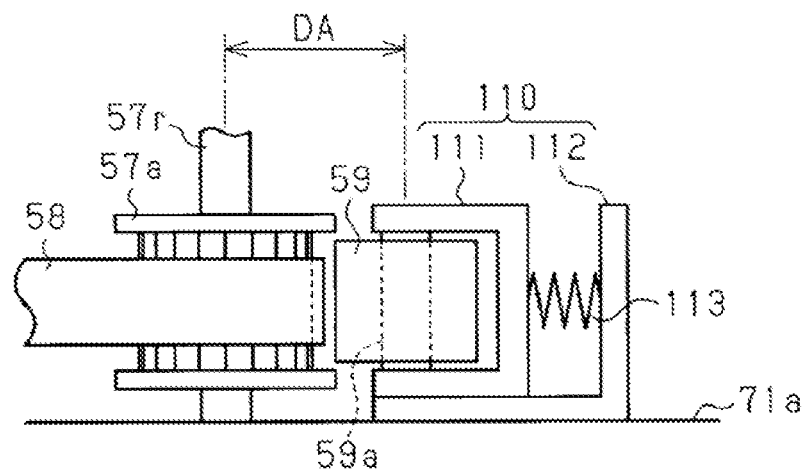
FIG. 11 is a side view of the separation reduction mechanism in FIG. 10.

A second modified example of the separation reduction mechanism will be explained with reference to FIGS. 10 and 11. FIG. 10 is a plan view of the separation reduction mechanism, and FIG. 11 is a side view of the separation reduction mechanism seen from a direction of an arrow A2.

The second modified example is an example in which the first modified example is further modified. The rotator 59 is disposed on the extension line of the line LE connecting the rotary center of the first gear 57*a* and the rotary center of the second gear 58*b*. The rotator 59 is supported by a stage 110 so as to be movable (closely and separately movable) along the extension line of the aforementioned line LE. In addition, the rotator 59 is biased so as to approach the first gear 57*a* by a biasing member 113 (for example, a coil spring, a plate spring, or a cushion).

The stage 110 includes a support body 111 supporting the support shaft 59*a* of the rotator 59, and a pedestal portion 112 supporting the support body 111 so as to be movable. The support body 111 is biased by the biasing member 113 so as to approach the first gear 57*a*.

According to the configuration, effects described below will be obtained. Since components of the door moving apparatus 50 have dimension error or assembling error when manufacturing, a spacing distance DA between the rotary shaft 57*r* of the first gear 57*a* and the support shaft 59*a* of the rotator 59 varies per product of the door moving apparatus 50. Accordingly, there is a case in which the spacing distance DA between the rotary shaft 57*r* of the first gear 57*a* and the support shaft 59*a* of the rotator 59 comes to be smaller than a minimum limit of size when the door moving apparatus 50 is produced. In this case, since the rotator 59 is pressed toward the endless belt 58, an excessive power is applied to the endless belt 58. Such products are removed by, for example, an examination, and the yield rate decreases.

On the other hand, according to the aforementioned configuration, the rotator 59 is disposed so as to be approachable and separable relative to the first gear 57*a*, and is biased toward the first gear 57*a*. Accordingly, even though the endless belt 58 comes in contact with the rotator 59 since the spacing distance DA between the rotary shaft 57*r* of the first gear 57*a* and the support shaft 59*a* of the rotator 59 decreases due to the dimension error of the components or the assembling error when manufacturing, the endless belt 58 is inhibited from being applied with the excessive power since, in this case, the rotator 59 moves so as to be away from the first gear 59*a*. That is, according to the configuration, comparing to the door moving apparatus 50 which does not include this configuration, the minimum limit of size of the spacing distance DA between the rotary shaft 57*r* of the first gear 57*a* and the support shaft 59*a* of the rotator 59 may increase, thereby the production yield may be enhanced.

A Third Modified Example

Figure 12:
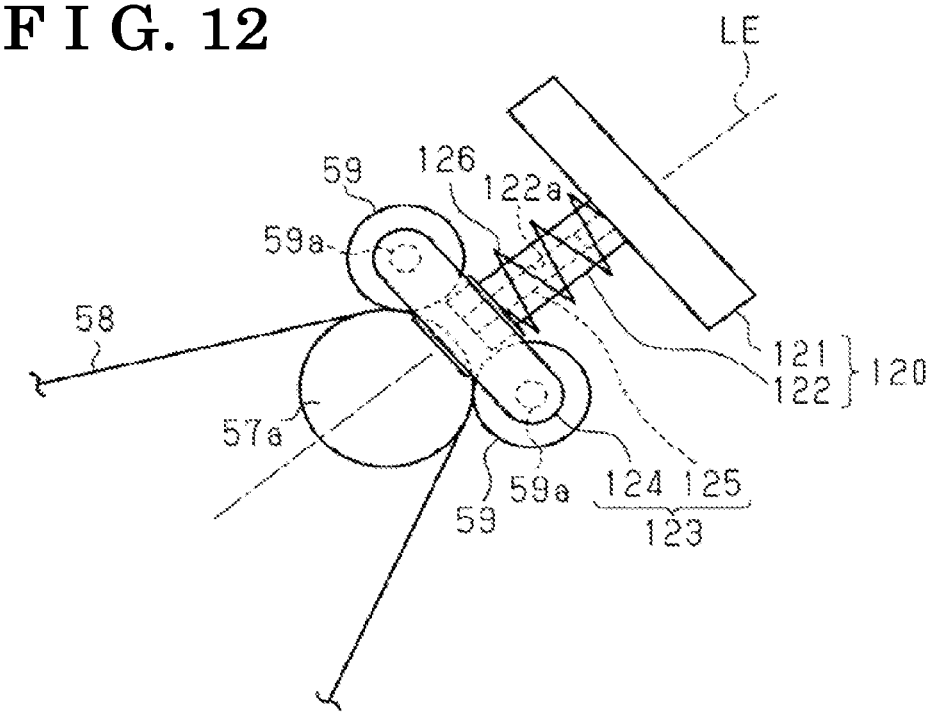
FIG. 12 is a plan view of a third modified example of the separation reduction mechanism.

A third modified example of the separation reduction mechanism will be explained with reference to FIG. 12. FIG. 12 is a plan view of the separation reduction mechanism.

The separation reduction mechanism of the third modified example includes the two rotators 59. The two rotators 59 are disposed at positions in accordance with an embodiment relative to the first gear 57*a*. The two rotators 59 are supported by a support portion 120, and are biased toward the first gear 57*a* by a biasing member 126.

The support portion 120 includes a base 121 fixed to the first case 71 and a cylindrical pole 122 extending from the base 121. The two rotators 59 are supported by a movable body 123.

The movable body 123 includes a support member 124 supporting the two support shafts 59*a*, and a shaft body 125 extending from the support member 124 and inserting into a hole 122*a* of the pole 122. The shaft body 125 of the movable body 123 is inserted into the hole 122*a* of the pole 122 so as to be movable. An extending direction of the pole 122 accords with the extending direction of the line LE connecting the rotary center of the first gear 57*a* and the rotary center of the second gear 57*b*. A biasing member 126 (for example, a coil spring) is disposed at the outer side of the pole 122. The biasing member 126 biases the movable body 123 toward the first gear 57*a*. In this configuration, similarly to the second modified example, because the rotators 59 are biased, the product yield is enhanced. Since the endless belt 58 comes in contact with the rotators 59 when separating from the preset running path L, the separation of the endless belt 58 from the preset running path L is reduced.

A Fourth Modified Example

Figure 13:
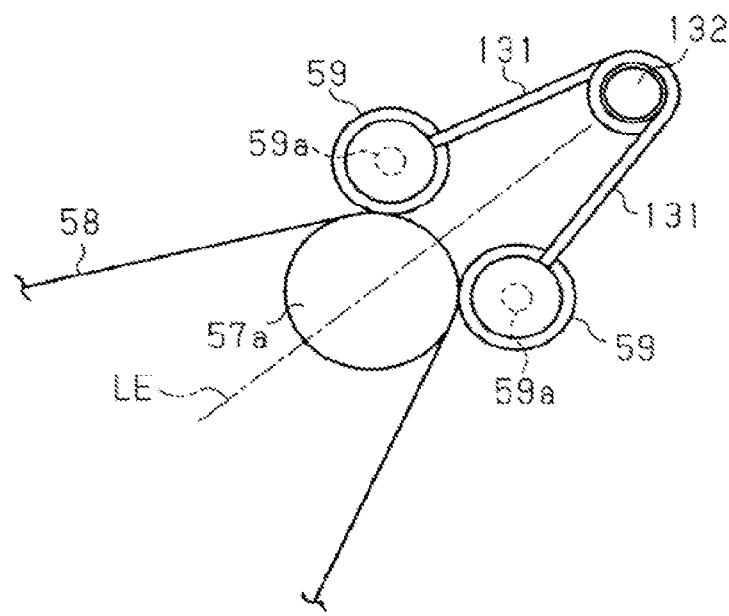
FIG. 13 is a plan view of a fourth modified example of the separation reduction mechanism.

A fourth modified example of the separation reduction mechanism will be explained with reference to FIG. 13. FIG. 13 is a plan view of the separation reduction mechanism.

The separation reduction mechanism of the fourth modified example includes the two rotators 59. The two rotators 59 are disposed in accordance with an embodiment relative to the first gear 57*a*. In addition, the two rotators 59 are biased toward the first gear 57*a* by a torsion spring 131 (see an explanation below) as a biasing member.

In particular, each of the two rotators 59 is supported by the torsion spring 131. That is, one end portion of the torsion spring 131 is fixed by a support pawl 132 and the other end portion of the torsion spring 131 supports the support shafts 59*a* of the rotators 59. A biasing direction of the torsion spring 131 corresponds to a vertical direction relative to the line LE connecting the rotary center of the first gear 57*a* and the rotary center of the second gear 57*b* or a direction intersecting at an angle close to the vertical direction.

In this configuration, similarly to the second modified example, since the rotators 59 are biased, the product yield is enhanced. In addition, since the endless belt 58 comes in contact with the rotators 58 when separating from the preset running path L, the separation of the endless belt 58 from the preset running path L is reduced.

A Fifth Modified Example

Figure 14:
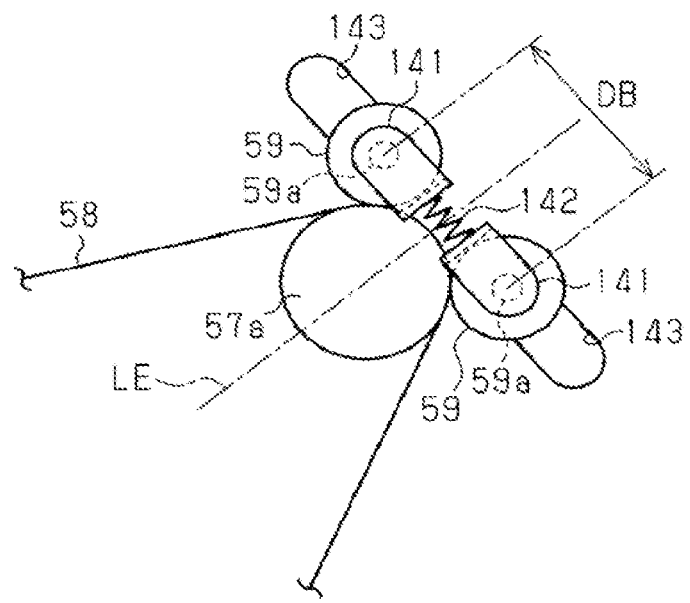
FIG. 14 is a plan view of a fifth modified example of the separation reduction mechanism.

A fifth modified example of the separation reduction mechanism will be explained with reference to FIG. 14. FIG. 14 is a plan view of the separation reduction mechanism.

The separation reduction mechanism of the fifth modified example includes the two rotators 9. The two rotators 59 are disposed at positions in accordance with an embodiment relative to the first gear 57*a*. In addition, the two rotators 59 are biased toward the line LE connecting the rotary center of the first gear 57*a* and the rotary center of the second gear 58*b* by a biasing member 142.

In particular, the support shafts 59*a* of the rotators 59 are supported by support members 141. The two support members 141 are connected with each other via the biasing member 142 (for example, a coil spring). The support members 141 are guided by guides 143 which are intersected orthogonally to the line LE connecting the rotary center of the first gear 57*a* and the rotary center of the second gear 57*b*, and slide along the guides 143.

A spacing distance DB between the two rotators 59 is set at a preset distance. The preset distance is set as a length which is obtained by adding a predetermined length (for example, a length twice as long as the tooth depth) to a length between the two rotators 59 when the two rotators 59 are disposed in a state of being in contact with the endless belt 58. According to this configuration, since the endless belt 58 comes in contact with the rotators 59 when separating from the preset running path L, the separation of the endless belt 58 from the preset running path L is reduced.

A Sixth Modified Example

Figure 15:
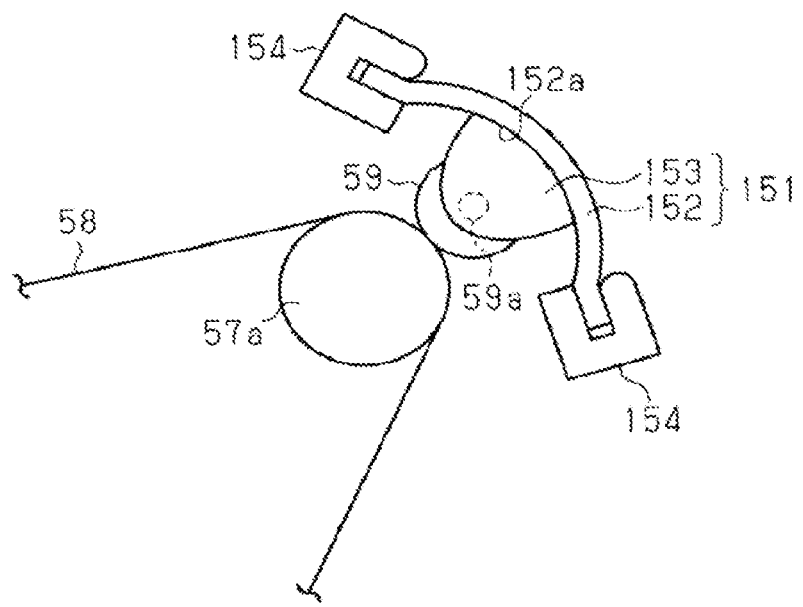
FIG. 15 is a plan view of a sixth modified example of the separation reduction mechanism.

A sixth modified example of the separation reduction mechanism will be explained with reference to FIG. 15. FIG. 15 is a plan view of the separation reduction mechanism.

The separation reduction mechanism of the sixth modified example includes the single rotator 59. The rotator 59 is disposed in accordance with the first modified example relative to the first gear 57*a*. In addition, the rotator 59 is biased toward the first gear 57*a* by a metal plate 152 (see an explanation below) as a biasing member.

In particular, the rotator 59 is supported by a support member 151. The support member 151 includes the curved metal plate 152 and a pair of support members 153 being provided at the metal plate 152. The support member 153 is disposed at an intermediate portion (a portion equally spaced apart from opposing ends) of the metal plate 152, and supports the support shaft 59*a* of the rotator 59. An initial shape of the metal plate 152 is warped. End portions of the support member 151 engage with engagement portions 154, respectively, provided at the first case 71 in a state where the metal plate 152 is further warped from the initial shape. Accordingly, a facing surface 152*a* facing the first gear 57*a* is biased so as to approach the first gear 57*a*. According to this configuration, advantages similar to those of the second modified example are obtained with a simple configuration.

Other Modified Examples

In the aforementioned embodiment, devices other than the aforementioned device may be equipped on the base 31 of the sliding door module 30. For example, a speaker unit for sound system may be equipped.

In the aforementioned embodiment, the sliding door module 30 has been explained as an example, however, the present technology may also be applied to the standalone door moving apparatus 50 which is not modulated. For example, the present technology may be applied to the door moving apparatus 50 which is mounted on the vehicle 1.

The invention claimed is:

1. A door moving apparatus comprising:
   a motor unit;
   a first gear mounted on a rotary shaft of the motor unit;
   a second gear having a diameter larger than a diameter of the first gear and teeth more than the first gear;
   an endless belt passing over the first gear and the second gear;
   a drum to which a rotary power of the second gear is transmitted via a rotary power transmission mechanism;
   a first case; and
   a rotator configured to reduce a separation of the endless belt from a preset running path, the rotator including a downstream rotator and a support shaft,
   wherein the downstream rotator is disposed downstream of the first gear in a running direction of the endless belt from the first gear to the second gear relative to a line connecting between a rotary center of the first gear and a rotary center of the second gear,
   the downstream rotator is disposed at a position away from the preset running path in a direction in which the endless belt separates from the preset running path during running so that the downstream rotator comes in contact with an outer surface of the endless belt when the endless belt separates from the preset running path during running,
   the downstream rotator is disposed at the position in a vicinity of the preset running path of the endless belt, where at least a portion of the first gear and at least a portion of the downstream rotator are overlapped with each other when seen from a direction orthogonal to a common tangential line between the first gear and the second gear,
   the first case is provided with and supports the support shaft, and
   at least a portion of the second gear and at least a portion of the motor unit are overlapped with each other when seen from a direction in which a rotary shaft of the second gear and the rotary shaft of the motor unit extend.

2. The door moving apparatus according to claim 1, wherein
   the rotator includes an upstream rotator, and
   each of the upstream rotator and the downstream rotator is disposed at a position which is in a vicinity of the preset running path of the endless belt, the position in which at least a portion of the first gear and at least a portion of the upstream and downstream rotators are overlapped with each other when seen from a direction orthogonal to a common tangential line between the first gear and the second gear.

3. The door moving apparatus according to claim 2, wherein the upstream rotator is disposed at an upstream in the running direction and does not come in contact with an outer surface of the endless belt.

4. The door moving apparatus according to claim 1, wherein
   the rotary power transmission mechanism includes
   a third gear which is provided at a rotary shaft of the second gear, the third gear including a diameter which is smaller than the diameter of the second gear and teeth less than the second gear; and a fourth gear to which the drum is mounted, the fourth gear including a diameter which is larger than the diameter of the third gear and teeth more than the third gear, the fourth gear meshing with the third gear.

5. The door moving apparatus according to claim 4, wherein the first and second gears form a first stage reduction gear, the third and fourth gears form a second stage reduction gear, and the endless belt is used in the first stage reduction gear in which rotary speed is higher than rotary speed in the second stage reduction gear.

6. The door moving apparatus according to claim 1, wherein the rotator is configured by a bearing.

7. A door moving apparatus comprising:
a motor unit;
a first gear mounted on a rotary shaft of the motor unit;
a second gear having a diameter larger than a diameter of the first gear and teeth more than the first gear;
an endless belt passing over the first gear and the second gear;
a drum to which a rotary power of the second gear is transmitted via a rotary power transmission mechanism;
a first case; and
a rotator configured to reduce a separation of the endless belt from a preset running path, the rotator including a downstream rotator and a support shaft,
wherein the downstream rotator is disposed downstream of the first gear in a running direction of the endless belt from the first gear to the second gear relative to a line connecting between a rotary center of the first gear and a rotary center of the second gear, the downstream rotator is disposed at a position away from the preset running path in a direction in which the endless belt separates from the preset running path during running so that the downstream rotator comes in contact with an outer surface of the endless belt when the endless belt separates from the preset running path during running, the downstream rotator is disposed at the position in a vicinity of the preset running path of the endless belt, where at least a portion of the first gear and at least a portion of the downstream rotator are overlapped with each other when seen from a direction orthogonal to a common tangential line between the first gear and the second gear, the first case is provided with and supports the support shaft, the rotary power transmission mechanism includes a third gear which is provided at a rotary shaft of the second gear, the third gear including a diameter which is smaller than the diameter of the second gear and teeth less than the second gear; and a fourth gear to which the drum is mounted, the fourth gear including a diameter which is larger than the diameter of the third gear and teeth more than the third gear, the fourth gear meshing with the third gear, and the first and second gears form a first stage reduction gear, the third and fourth gears form a second stage reduction gear, and the endless belt is used in the first stage reduction gear in which rotary speed is higher than rotary speed in the second stage reduction gear.

\* \* \* \* \*